United States Patent [19]

Atkins et al.

[11] Patent Number: 5,004,765

[45] Date of Patent: Apr. 2, 1991

[54] LOW PROFILE MOLDING SYSTEM

[75] Inventors: Kenneth E. Atkins, S. Charleston; Robert R. Gentry, St. Albans; Raymond C. Gandy, Hurricane, all of W. Va.

[73] Assignee: Union Carbide Chemicals & Plastics Technology Corporation, Danbury, Conn.

[21] Appl. No.: 431,831

[22] Filed: Nov. 6, 1989

Related U.S. Application Data

[63] Continuation-in-part of Ser. No. 175,987, Mar. 31, 1988.

[51] Int. Cl.$^5$ .......................... C08K 7/14; C08K 7/06; C08L 67/07; C08L 67/06
[52] U.S. Cl. ..................... 523/434; 523/436; 523/523; 523/527; 525/29
[58] Field of Search ............... 523/523, 527, 434, 436; 524/506; 525/29

[56] References Cited

U.S. PATENT DOCUMENTS

| | | |
|---|---|---|
| 3,887,515 | 6/1975 | Pennington et al. ............. 523/434 |
| 4,032,494 | 6/1977 | Gentry ............................ 260/29.1 |
| 4,409,344 | 10/1983 | Moulson et al. ................. 523/512 |
| 4,555,534 | 11/1985 | Atkins ............................ 523/507 |

Primary Examiner—Lewis T. Jacobs
Attorney, Agent, or Firm—Bonnie L. Deppenbrock

[57] ABSTRACT

A molding additive composition comprising a mixture of low profile additive and a surfactant additive containing a silicon-oxyalkylene copolymer flow control agent and surface modifying agent; and a molding composition comprising a polyester molding resin, a low profile additive, a silicon-oxyalkylene copolymer flow control agent and surface modifying agent and a crosslinking monomer. In another embodiment, the invention embraces a molding composition comprising a polyester molding resin, a crosslinking monomer, a low profile additive, a reinforcing fiber, and a silicon-oxyalkylene copolymer flow control agent and surface modifying agent.

17 Claims, No Drawings

LOW PROFILE MOLDING SYSTEM

This application is a continuation-in-part of prior U.S. application Ser. No. 175,987 filed on March 31, 1988.

BACKGROUND TO THE INVENTION

1. Field of the Invention

The invention generally relates to a molding additive composition comprising a mixture of a low profile additive and a surfactant additive containing a silicon-oxyalkylene copolymer flow control agent and surface modifying agent. The invention also relates to a molding composition comprising a polyester molding resin, a low profile additive, and a silicon-oxyalkylene copolymer flow control agent and a surface modifying agent. A preferred composition of the invention contains a crosslinking monomer. In its most preferred embodiment, the invention specifically relates to a molding composition comprising a polyester molding resin, a crosslinking monomer, a low profile additive, a reinforcing fiber, and a silicon oxyalkylene copolymer flow control agent and surface modifying agent.

2. Prior Art

Low profile additives have been used commercially for about 30 years. They are valuable additives to thermosetting molding compositions that are used to generate molded articles that possess minimal shrinkage. Generally, the low profile additives are thermoplastic materials which at the curing temperature of the thermosetting resin, have a limited degree of compatibility with the cured resin. Consequently, the additive separates from a condition of solution with the cured molding resin, creating void spaces in the surface of the molded article which occupy the space in the mold created by shrinkage of the resin due to the thermosetting crosslinking reaction.

Looking at the low profile additive development in a more limited sense, it relates to a technical improvement that has made a significant contribution to commercial polyester molding technology. The use of low profile additives to reduce shrinkage during the curing reaction result in improving dimensional stability and surface smoothness of unsaturated polyester resins. Low profile additives are typically thermoplastic polymers such as vinyl acetate polymers, polystyrene, acrylic polymers, polyurethanes, aliphatic polyesters (such as derived from polycaprolactones and aliphatic polyesters derived from dicarboxylic acids and aliphatic diols).

There are a number of theories that seek to explain the low profile or anti-shrinkage action of these polymers, but the one that seems to best explain the phenomenon relative to unsaturated polyesters blended with styrene monomer is as follows.

The low profile additive is at least partly soluble in the uncured polyester/styrene solution. As the polyester/styrene mixture crosslinks, the thermoplastic polymer becomes incompatible or less soluble and at least partly comes out of solution. This action causes a volume expansion that compensates for the shrinkage that occurs when the polyester/styrene mixture crosslinks.

The development of low-profile thermosetting resin compounds, such as unsaturated polyester compounds, has led to a wide acceptances of these materials by the transportation and other industries because of their good surface appearance, dimensional stability, physical properties, assembly consolidation and potential weight savings. However, as new applications have developed, standards have been raised, making it desirable to have even better surface appearance and the elimination of ripples and waviness that sometimes develop, particularly in relatively large appearance sensitive areas.

Developments have been made in this art which are related to special compositions and special problems. For example, U.S. Pat. No. 4,032,494, patented June 28, 1977, uses liquid siloxanes as additives, in polyester composites containing vinylacetate polymers to reduce the water absorption of the cured polyester composite. The siloxanes illustrated in the patent all possess the silicone structure, to the essential exclusion of other structures, though the patent fails to indicate that other structures are not embodied by the invention of the patent.

In relating to a pigmentability problem, U.S. Pat. No. 4,555,534, patented Nov. 26, 1985, embraces a curable molding composition containing: (a) a polyester resin; (b) an olefinically unsaturated monomer; (c) a thickening agent comprising an oxide or hydroxide of a metal of Group I, II, or III of the Periodic Table; (d) a pigment; (e) a carboxylated vinyl acetate polymer low profile additive; and (f) a surface active compound that is employed in an amount sufficient to enhance the uniformity of the pigmentation of the cured composite produced from said curable molding composition.

The patent describes a wide variety of surface active compounds that enhance the uniformity of the pigmentation of the cured composite produced from the curable molding compositions. The patent also characterizes a number of surface active compounds that fail to enhance the uniformity of the pigmentation of the cured composite produced from the curable molding compositions. For example, Table XV, at column 16 of the patent, lists a number of surface active compounds that failed to enhance the uniformity of pigmentation. Those were the surfactants that yielded a "pigmentability rating" of less than 3, and appear to comprise those surfactants that were not cited in Table XVI of the patent. Table XVII, at Col. 17, indicates that the control, using a different low profile additive than the one used with Tables XV and XVI, had a "pigmentability rating" of 1, and Table XVIII lists surfactants which gave a pigmentability rating of 2 or more, "which means that they improved the pigmentability compared with the formulation containing no surfactant." Of the about 94 illustrations of surfactants mentioned in Table XV, L-5420 and L-5303, Column 16, are siloxane-polyoxyalkylene copolymers. They gave pigmentability ratings of 2, meaning, according to the discussions before Table XVI, they failed to improved the pigmentability. There is no indication as to how they would have fared if used with the low profile system that was employed with Tables XVII and XVIII.

None of these materials described in U.S. Pat. No. 4,555,534 are shown to be flow control agents or surface modifying additives. They are described to enhance pigmentability, which means the composition has to possess a pigment. This patent is restricted in its teachings to compositions containing pigments.

The invention is concerned with an improvement in thermosetting resin molding compositions and additive compositions which may be employed in making effective thermosetting resin molding compositions. The present invention contemplates molding compositions suitable for compression, casting, transfer, injection, pultrusion, resin transfer, vacuum forming, and the like, molding techniques. The present invention is directed to thermoset molding systems possessing enhanced flow characteristics and surface control.

Fiber reinforced plastics (FRP) are being considered for many new automotive applications. The quality of these new FRP parts will be affected by the flow of the molding compound in the press. A screening evaluation of thirty potential flow additives in bulk molding composition has indicated that among the best candidates identified for flow improvement are silicone surfactants of the type characterized herein. Some have shown to be very effective in raising tensile strength (from 25-60%).

Some of the problems associated with fiber reinforced plastics (FRP) are porosity, blisters, non-fills, surface smoothness, and strength properties. The degree to which any of the above become problems could depend on the flow of the molding compound during the heterogeneous mixture of resin, filler and fiberglass. The flow comes from the resin portion (30 weight percent) which must distribute the filler (about 42 weight percent) and the fiberglass about 30 weight percent) uniformly over the molded fiberglass part.

As these materials flow, they push out the air which, if not removed, could cause porosity, blisters and poor Physicals. How smoothly and evenly these materials flow determines many times how smooth the surface will be. Some of the factors that influence flow are listed below:

(a) Molding formula
(b) Filler content
(c) Fiberglass length and concentration
(d) Polyester
(e) Peroxide initiator
(f) Inhibitor level It has been determined that many of the problems concerning the moldability of fiber reinforced plastics are ameliorated by the provision of the flow additives of the present invention. The flow improvements provided by the present invention allows the invention to help in meeting the increase in quality standards for fiber reinforced molded parts, especially as set by automotive manufacturers and owing to the fact that the new parts being molded 1. Are larger and more complex
2. Have large, flat surfaces which require smoother surfaces
3. Use polyester resin systems which provide enhanced toughness but which do not flow as well, and
4. Require higher glass contents to get desired strength properties.

The present invention contemplates the use of resin systems that employ low profile additives in combination with a variety of thermosetting resins, that is, resins that cure by crosslinking through functional groups in the polymeric resin. The greatest proportion of the resin systems employ unsaturated polyester resins. Other resins include, e.g., phenolic resins, epoxy resins, urethane resins, and the like.

It is an object of the invention to provide a molding composition that provides one or more of the following advantages: improve flow during molding; improved physicals for the molded product; smoother surfaces for the molded product, i.e., better replication of the mold and the mold's dimensions; and molded fiber reinforced plastic parts that have less shrinkage.

Another object of the present invention is the fact that none of the aforementioned compositions require the presence of a pigment. In the usual case in practicing the invention, the compositions will be free of pigments. Moreover, it is not the intent of the invention to provide improved pigmentability or reduced water absorbency.

SUMMARY OF THE INVENTION

The invention provides a molding additive composition comprising a mixture of (a) a thermosetting unsaturated polyester or vinyl ester, (b) a low profile additive, (c) a crosslinking monomer and (d) a silicon-oxyalkylene copolymer flow control agent. A preferred embodiment of the present invention contains a crosslinking monomer that is an acrylate or methacrylate derivative; a silicon-oxyalkylene copolymer which contains (a) at least one silicon per molecule; (b) at least 2 alkylene oxide moieties in a sequence per molecule; and (c) the alkylene oxide are bonded to silicon to the molecule through a carbon to silicon bond; and a low profile additive which is a thermoplastic polymer having a molecular weight greater than that of the silicon-oxyalkylene copolymer.

Another embodiment of the present invention includes a molding composition comprising a polyester molding resin; a low profile additive; and a silicon-oxyalkylene copolymer flow control agent and surface modifying agent which may contain a functional group reactive with the polyester molding resin, such as an olefinic unsaturation and a crosslinking monomer.

Another embodiment of the present invention includes a fiber reinforced molding composition comprising (a) a thermosetting unsaturated polyester or vinyl ester;
(b) a cross-linking monomer;
(c) a low profile additive;
(d) a silicon-oxyalkylene copolymer flow control agent and surface modifying agent.
(e) a reinforcing fiber, and An effective amount of the silicon oxyalkylene copolymer flow control agent and surface modifying agent in the compositions of the present invent is typically from about 1.0 to about 10 weight percent, preferably from about 1.0 to about 5 weight percent, most preferably from about 2.0 to about 3.0 weight percent based on the combined weight of the component.

Once formulated, the compositions of the present invention can be molded into thermoset articles of desired shape, particularly thermoset articles such as automobile fenders, dashboards and the like. The actual molding cycle will, of course, depend upon the exact composition being molded as well as upon the nature of a particular cured product desired. Suitable moldings cycles are conducted at temperatures of the order of about 100° C. to about 182° C. for periods of time ranging from about 0.5 minutes to about 5 minutes.

DETAILED DESCRIPTION OF THE INVENTION

In accordance with the present invention thermosetting polyester resins suitable for use herein are polyester resins that are reaction products of a dicarboxylic acid or anhydride, with a polyhydric alcohol. The dicarboxylic acids or anhydrides that are employed to produce the polyester, either singly or in combination, includes those that contain olefinic unsaturation, preferably wherein the olefinic unsaturation is alpha, beta to at least one of the carboxylic acid groups. Such acids include maleic acid or anhydride, fumaric acid, methyl-maleic acid, and itaconic acid. Maleic acid or anhydride and fumaric acid are the most widely used commercially.

In addition to the olefinically unsaturated acid or anhydride, saturated and/or aromatic dicarboxylic acids or anhydrides may also be employed in producing the polyester. Such acids include phthalic acid or anhydride, terephthalic acid, hexahydrophthalic acid or anhydride, adipic acid, isophthalic acid, and "dimer" acid (i.e., dimerized fatty acids).

A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane. As a rule, not more than about 20 mole percent of the polyol will be a triol, with the remainder being one or more diols.

As is known in the art, polyesters that are employed in thickened molding compositions must contain residual acidity in order to enter into the thickening reaction. The nature and production of the polyesters used in such applications, including dicyclopentadiene modified resins, are known in the art and are described in U.S. Pat. No. 3,933,757 and U.S. Pat. No. 3,883,612, which are incorporated herein by reference.

Vinyl ester resins that have been advantageously employed in both bulk molding compounds (BMC) and sheet molding compounds (SMC) are resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing the unsaturated polyester resins may be used in proportions of at least about 0.1 mole of anhydride per equivalent of hydroxyl group up to an amount sufficient to react with each hydroxyl.

Thermosetting resins that are classified herein as vinyl ester resins, which contain the characteristic linkages and terminal, polymerizable unsaturated groups are fully disclosed in U.S. Pat. No. 3,887,515, to Pennington, et al., along with the preparation of such resins. A further description of these well known resins is regarded to be unnecessary for them to be used in the practice of this invention. Vinyl ester resins are embraced by the term unsaturated polyester resin.

In a preferred embodiment, low profile additive resin systems of the present invention employ low viscosity crosslinking monomers. When the resin is an unsaturated polyester, including vinyl ester, it is preferred that the monomers contain ethylenic unsaturation such that the monomer is copolymerizable with the polyester and terminally unsaturated vinyl ester resins. Useful monomers include monostyrene, alkyl acrylates and methacrylates such as $C_{1-12}$ alkyl acrylates and methacrylates, substituted styrenes such as $\alpha$-methyl styrene, $\alpha$-chlorostyrene, 4-methylstyrene, and the like, divinylbenzene, acrylonitrile, methacrylonitrile, and the like. Styrene is the preferred monomer herein and in commercial practice today, although others may be used.

A low viscosity crosslinking monomer is also employed in the resin composition (the thermosetting resin may be a solid at ambient temperatures, i.e., about 20°-25° C.) to dissolve the resin thereby ensuring that the resin composition is a fluid. In this case, the monomer acts as a reactive diluent. Enough monomer is employed so that the viscosity of the fluid is at a convenient level for processing. Excessive amounts of the monomer should be avoided because an excess can have an adverse effect on the cured resin's properties. For example, too much monomer tends to cause embrittlement of the cured polyester. With these guidelines, effective proportions of the monomer are normally found within the range of from about 25 to about 70, and preferably 30 to 55, weight percent, based on weight of thermosetting polyester resin plus monomer and thermoplastic additive.

When desired, a thickening agent can also be employed in the compositions of the invention. Such materials are known in the art, and include the oxides and hydroxides of the metals of Group I, II and III of the Periodic Table. Illustrative examples of thickening agents include magnesium oxide, calcium oxide, calcium hydroxide, zinc oxide, barium oxide, magnesium hydroxide and the like, including mixtures of the same. Thickening agents are normally employed in proportions of from about 0.1 to about 6 weight percent, based upon weight of the polyester resin, crosslinking monomer and low profile additive.

Alternatively, a dual thickening system may be employed. This involves, for example, a metallic oxide or hydroxide and a polyisocyanate where the amount of isocyanate is theoretically equivalent to at least 0.3 of the available hydroxyl groups but not more than about 1.05 times the available hydroxyl groups, and the amount of metallic oxide or hydroxide is sufficient to react with at least thirty percent of the carboxyl groups but not more than seventy-five percent of the carboxyl groups present. Belgium Pat. No. 849,135 to Epel et al. contains a description of such dual thickening systems.

The compositions of the present invention may employ a second crosslinkable vinyl monomer having a reactivity ratio with styrene of greater than 1 and may also include a thermosetting epoxy resin containing at least one 1,2-epoxy group per molecule according to the teachings of Atkins, U.S. Pat. No. 4,673,706, patented June 16, 1987.

An essential component of the compositions of the present invention are thermoplastic low profile additives. In one preferred embodiment, the low profile additives that may be employed in the invention are thermoplastic polymers of vinyl acetate, saturated thermoplastic polyesters, and mixtures of the same. In another embodiment of the invention, the low profile additives that may be employed are thermoplastic polyalkyl methacrylate polymers.

Suitable thermoplastic vinyl acetate polymer low profile additives are poly(vinyl acetates) homopolymers and thermoplastic copolymers containing at least 50 weight percent vinyl acetate. Such polymers include, for example, vinyl acetate homopolymer, carboxylated vinyl acetate polymers including copolymers of vinyl acetate and ethylencially unsaturated carboxylic acids, such as acrylic acid, methacrylic acid, crotonic acid, maleic acid, fumaric acid, itaconic acid, and the like, or anhydrides such as maleic anhydride, vinyl acetate/vinyl chloride/maleic acid terpolymers, and the like. U.S. Pat. No. 3,718,714 to Comstock, et al, and British Pat. No. 1,361,841 to Comstock, et al. contain descriptions of some of the suitable vinyl acetate polymer low profile additives.

The useful vinyl acetate polymer low profile additives generally have molecular weights within the range of from about 10,000 to about 250,000 and preferably from about 25,000 to about 175,000. They are usually employed in proportions of from about 5 to 25, and preferable from about 9 to 16, weight percent, based on the combined weight of the polyester the thermoplastic profile additive, and monomer.

Suitable thermoplastic saturated polyester low profile additives are, in general, low molecular weight saturated polymerates of polymerizable linear and/or cyclic esters and carboxylated saturated polymers of said polymerizable esters having at least one carboxyl group per molecule.

Polymers of linear and/or cyclic esters, including carboxylated polymers having an average of at least one carboxyl group per molecule which may be used in accordance with the present invention are those which possess a reduced viscosity of at least about 0.1, and preferably from about 0.5 to about 15 and higher. The preferred polymers of cyclic esters have a reduced viscosity of about 0.2 to about 10.

Suitable polymers are further characterized by the following basic recurring structural Unit I

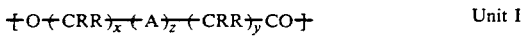 Unit I wherein each R, which can be the same or different, is hydrogen, halogen, i.e. chlorine, bromine, iodine, or fluorine, or a monovalent hydrocarbon radical generally containing a maximum of 12 carbon atoms, and preferably containing a maximum of eight carbon atoms. A is an oxy (—O—) group; x is an integer having a value of 1 to 4 inclusive, y is an integer having a value of 1 to 4 inclusive, z is an integer having a value of 0 or 1, with the proviso that (a) the sum of x+y+z is 4 to 6 inclusive and (b) the total number of R variables which are substituents other than hydrogen does not exceed 2.

Illustrative of suitable monovalent hydrocarbon radicals for R are the following: alkyl radicals such as methyl, ethyl, isopropyl, n-butyl, sec-butyl, t-butyl, n-hexyl, 2-ethylhexyl, n-dodecyl, chloroethyl, chloropropyl and the like; alkoxy radicals such as t-methoxy, ethoxy, n-propoxy, n-hexoxy, n-dodecoxy and the like; aryl radicals such as phenyl, ethyl phenyl n-propylpheny n-butylphenoxy and the like: aryloxy radicals such as phenoxy, n-propylphenoxy, n-butylphenoxy and the like; cycloaliphatic radicals such as cyclopentyl, cyclohexyl, and the like.

In one embodiment, desirable polymers of cyclic esters are characterized by both basic recurring structural Unit I, supra, and basic recurring structural Unit II, and are obtained from a mixture containing a cyclic ester and a cyclic monomer such as ethylene oxide propylene oxide and the like.

$$+O-CHR'-CHR'+$$ Unit II wherein each R', is as defined for R of Unit I, or in which the two R' variables together with the ethylene moiety of the oxyethylene chain of Unit II form a saturated cycloaliphatic hydrocarbon ring having from four to eight carbon atoms inclusive. It is referred that recurring Unit II contains from two to twelve carbons atoms inclusive. The interconnection of Unit I and the Unit II does not involve or result in the direct bonding of two oxy groups i.e., —O—O—.

Particularly preferred polymers of cyclic esters are those which are characterized by the oxypentamethylenecarbonyl chain as seen in basic recurring structural Unit III

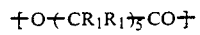 Unit III wherein each $R_1$ is hydrogen or lower alkyl, that is, alkyl having a maximum of 4 carbon atoms, with the proviso that no more than three $R_1$ variables are substituents other than hydrogen.

Thermoplastic saturated polymers of linear and/or cyclic esters are well known and the carboxylated saturated esters are well known and such thermoplastic saturated polymers, and particularly polymers prepared from epsilon-caprolactones, have been advantageously employed as low profile additives. Reference, for example, is made to U.S. Pat. Nos. 3,549,586 and 3,668,178 to Comstock et al. for descriptions of thermoplastic saturated polyester low profile additives and carboxylated thermoplastic saturated polyester low profile additives prepared from cyclic esters.

Also included are thermoplastic saturated polyesters based on saturated (i.e., free of olefinic unsaturation that is reactive with the resin in the molding application) dicarboxylic acids, such as adipic acid, isophthalic acid, terephthalic acid, and the like, and organic diols, such as ethylene glycol, diethylene glycol, neopentyl glycol, 1,6-hexanediol, and the like. These polyesters are described in, for example, U.S. Pat. Nos. 3,909,483; 3,994,853; 3,736,278; and 3,929,868.

Thermoplastic urethanes are useful low profile additives, alone or in admixture with other low pressure additives, and examples of them can be found in U.S. Pat. No. 4,035,439, patented Oct. 17, 1975, EP 74 746, published Sept. 3, 1981, and U.S. Pat. No. 4,421,894, patented Mar. 2, 1979.

The thermoplastic saturated polyester low profile additives may usually be employed in the compositions of the present invention in proportions similar to those of thermoplastic vinyl acetate polymers, i.e., in proportions from about 5 to 25 weight percent, and preferably from about 10 to 20 weight percent, based on the weight of polyester, thermoplastic polymer and crosslinkable monomer.

Also suitable in certain aspects of the invention are thermoplastic polymeric alkyl acrylates or methacrylates low profile additives including, for example, homopolymers of methyl methacrylate, ethyl methacrylate, butyl methacrylate, methyl acrylate, ethyl acrylate; copolymer of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, and methacrylic acid. Other useful thermoplastics for the low profile additive function include polystyrene, styrene copolymers, such as styrene/butadiene copolymers, cellulose acetate butyrate, alkylene oxide polymers, and the like.

Molecular weight of the alkyl acrylate or methacrylate polymers useful in the invention may vary over a wide range from 10,000 to 1,000,000, and preferably from 25,000 to 500,000.

The thermoplastic polymer should be present in amounts ranging from 1 to 25 percent by weight, based on the weight of polyester, low profile additive and crosslinking monomer, and preferably from 5 to 20 percent by weight.

The silicon-oxyalkylene copolymer, used as the flow control agent and surface modifying agent for thermosetting resins containing a low profile additive, contains (i) at least one silicon per molecule (ii) at least 2 alkylene oxide moieties in a sequence per molecule; and (iii) the alkylene oxide are bonded to silicon in the molecule through a carbon to silicon bond.

Preferably, the silicon-oxyalkylene copolymer has a molecular weight less than that of the thermoplastic low profile additive. With these parameters in mind, the silicon-oxyalkylene copolymer can assume a wide variety of structures, such as:

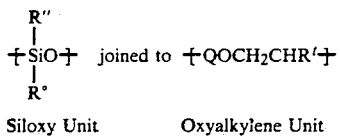

Siloxy Unit    Oxyalkylene Unit wherein the siloxy unit is directly bonded to other siloxy units, and at least one siloxy unit is directly bonded to the oxyalkylene unit by a carbon to silicon covalent bond, where the carbon of the covalent bond is covalently associated, though not necessarily directly (preferably indirectly) with the oxyalkylene unit, $R'$ is alkyl of 1 to about 8 carbon atoms, $R''$ and $R°$ are hydrogen, organo such as alkyl of 1 to about 4 carbon atoms, aryl or siloxy oxygen, at least one of which is organo and Q is divalent alkylene. The silicon component of the silicon-oxyalkylene copolymer may be terminated by $R_3Si$ groups wherein R may be an alkyl group having about 1 to 4 carbon atoms. The examples below illustrate a diverse choice of silicon-oxyalkylene copolymers.

A desirable form of silicon-oxyalkylene copolymers are those which possess functional groups which are complimentarily reactive with the thermosetting molding resin. For example, an unsaturated polyester molding resin contains as potentially reactive groups, the olefinic unsaturation, the carboxylic groups and the alcoholic hydroxyl groups. Each is typically involved in the ultimate setting up and curing of the resin. Thus, silicon-oxyalkylene copolymers can possess functional groups which are reactable with the functional groups of the resin. Illustrative of such groups are:

(i) alkenyl, such as vinyl, allyl, and the like;

(ii) alkenyloic, such as methacrylyl, acrylyl, maleayl, iticonyl, and the like;

(iii) hydroxyalkyl, such as hydroxymethyl, -hydroxyethyl, -hydroxyl-n-propyl, and the like;

(iv) carboxyalkyl or carboxyaryl;

(v) mercaptoalkyl analogs to the hydroxyalkyl; and the like.

Such functional groups typically occupy a terminal position on the structure of the copolymer. The amount of these groups can vary depending on the level of reactivity of the copolymer with the resin one desires. Because these copolymers typically are longer molecular structures, they contribute less to the embrittlement of the resin polymer than the crosslinking monomer. An advantage of such functionality in the copolymer is that such helps to bind the copolymer into the cured resin thereby avoiding the seeping of copolymer from the body of the molding composition during curing.

Silicon-oxyalkylene copolymers are better than the "state of the art" Microthene . The shorter chain dimethyl siloxanes/polyethers copolymers appear to have more effective flow additive properties than the higher molecular weight materials.

In addition to the improved flow, increased tensile and flexural properties are noted with some of the flow additives. These strength properties are listed below and some of the better flow additive properties are also compared. Less shrinkage is noted for many of the panels containing flow additives. Lower shrinkage usually is reflected in better surfaces. When these panels are painted with a gloss black automotive topcoat and evaluated, all of the additives gave better surfaces than the control. Data made on samples molded on the ASTM tree mold transfer press indicates that certain silicon-oxyalkylene copolymers improve the overall distribution of the physical properties.

The silicon-oxyethylene copolymers may be used in combination with non-silicon containing polyoxyalkylene material. A variety of such materials have been evaluated as reflected is the examples below. They may be used in about the same range cited herein for the silicon-oxyethylene copolymer.

The polyester molding composition may also contain one of more of the known types of conventional additives, which are employed for their known purposes in the usual amounts. The following are illustrative of such additives:

1. Polymerization initiators such as t-butyl hydroperoxide, t-butyl perbenzoate, benzoyl peroxide, cumene hydroperoxide, methyl ethyl ketone peroxide, and others known to the art. The polymerization initiator is employed in a catalytically effective amount, such as from about 0.3 to about 2 to 3 weight percent, based on the weight of polyester, the crosslinking monomer and the low profile additive component.

2. Fillers such as clay, hydrated alumina, silica, calcium carbonate and others known to the art.

3. Reinforcing fillers such as glass fibers or fabrics, carbon fibers or fabrics, asbestos fibers or fabrics, various organic fibers or fabrics such as those made of aromatic polyamides such as Kevlar TM, polypropylene, acrylonitrile vinyl chloride copolymer, and others known to the art. The invention is particularly desirable when fiber reinforcement is provided in the molding composition. Though glass fibers are commonly employed to make fiber reinforced composites, carbon fiber, whether graphitic or not, and the aromatic polyamides fibers are suitably employable in the practice of this invention. The fibers are usually employed in staple cut form, however, continuous filaments may be employed, particularly if the invention is to be employed to make prepreg composite compositions. The amount of fibers used in the compositions of the invention is not narrowly limited and depends on the application in mind. The amount may typically range from about 10 to about 65 weight percent of the resultant composite's weight.

4. Mold release agents or lubricants, such as zinc stearate, calcium stearate, and others known to the art.

5. Rubbers or elastomers such as:

(a) homopolymers or copolymers of conjugated dienes having a weight average molecular weight of 30,000 to 400,000 or higher as described in U.S. Pat. No. 4,020,036. The conjugated dienes contain from 4-12 carbon atoms per molecule such as 1,3-butadiene, isoprene, and the like.

(b) epihalohydrin homopolymers, a copolymer of two or more epihalohydrin monomer, or a copolymer of an epihalohydrin monomer(s) with an oxide monomer(s) having a number average molecular weight ($M_O$) which varies from about 800 to about 50,000, as described in U.S. Pat. No. 4,101,604.

(c) chloroprene polymers including homopolymers of chloroprene and copolymers of chloroprene with sulfur and/or with at least one copolymerizable organic monomer wherein chloroprene constitutes at least 50 weight percent of the organics monomer make-up of the copolymer as described in U.S. Pat. No. 4,161,471.

(d) hydrocarbon polymers including ethylene/propylene dipolymers and copolymers of ethylene/propylene and at least one nonconjugated diene, such as ethylene/propylene/hexadiene/ norbornadiene, as described in U.S. Pat. No. 4,161,471.

(e) conjugated diene butyl elastomers, such as copolymers consisting of from 85 to 99.5% by weight of a $C_4$–$C_7$ isolefin combined with 15 to 0.5% by weight of a conjugated multi-olefin having 4 to 14 carbon atoms, copolymers of isobutylene and isoprene where a major portion of the isoprene units combined therein have conjugated diene unsaturation as described in U.S. Pat. No. 4,160,759.

(f) acrylonitrile/butadiene copolymers.

Once formulated, the compositions can be molded into thermoset articles of desired shape, particularly thermoset articles such as automobile fenders, dashboards and the like. The actual molding cycle will, of course, depend upon the exact composition being molded as well as upon the nature of a particular cured product desired. Suitable moldings cycles are conducted at temperatures of the order of about 100° C. to about 182° C. for periods of time ranging from about 0.5 minutes to about 5 minutes.

Whereas the exact scope of the present invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

Description of the materials:

Union Carbide - LP-40A- A product of Union Carbide Chemicals and Plastics Inc. which is a copolymer of vinyl acetate and acrylic acid (40 weight percent) dissolved in styrene (60 weight percent).

Snowflake ™ - A calcium carbonate filler sold by Thompson-Weimann, Inc. having a mean particle size of 5 microns.

Modifier M - A 33 weight percent dispersion of magnesium oxide in an unsaturated polyester carrier vehicle sold by USS Chemicals/Polyester Unit.

PG- 9089 - is a dispersion of magnesium hydroxide and calcium hydroxide sold by Plasticolors, Inc. as a thickening agent.

Camel Wite - a calcium carbonate filler of 2.5 micron average particle size sold by H.T. Campbell & Co.

ASP400 - a clay filler sold by Engelhard.

Cal White II - a calcium carbonate filler of 5 micron average particle size sold by Georgia Marble.

Union Carbide Chemicals and Plastics Inc. LP-90 - a non carboxylated poly(vinyl acetate) low profile additive at 40 weight percent in styrene.

PG-9033 - a 40% magnesium oxide dispersion sold by Plasticolors, Inc.

Koppers 3702-5 - a highly reactive unsaturated polyester resin for molding application sold by the Koppers Co.

PEP-308 - a cobalt-based cure promoter sold by Air Products Company.

OCF-980 - a fiber glass reinforcement sold by Owens Corning Fiberglass.

PPG-3029 - a highly reactive unsaturated polyester resin containing about 35 percent styrene sold by Freeman Chemical.

PDI-1805 and 1803 - are pigment dispersions sold by Pigment Dispersions, Inc. to provide a standard automotive grey appearance to molded parts with no particular emphasis on color uniformity.

PBQ - a para-benzquinone which is an inhibitor to prevent premature curing of a molding composition.

Union Carbide Chemicals and Plastics Inc. XLP-4514 - a carboxylated poly(vinyl acetate) in styrene combined with an epoxy compound and a lower reactivity secondary vinyl monomer.

Union Carbide Chemicals and Plastics Inc. UCON 50HB55 - a 50% ethylene oxide 50% propylene oxide copolymer started with butanol sold by Union Carbide Chemicals and Plastics Inc..

Union Carbide Chemicals and Plastics Inc. Tergitol NP-14 - an ethylene oxide polymer started with nonyl phenol sold by Union Carbide Chemicals and Plastics Inc..

Union Carbide Chemicals and Plastics Inc. UCON 50HB5100 - a higher molecular weight 50% ethylene oxide 50% propylene oxide copolymer started with butanol sold by Union Carbide Chemicals and Plastics Inc..

LHT-240 - a polypropylene oxide polyol started with glycerine sold by Union Carbide Chemicals and Plastics Inc..

PDO - A 50% dispersion of tert-butylperoctaoate in dioctyl phlhalate sold by the Lucidol Division of Pennwalt Corp.

Union Carbide Chemicals and Plastics Inc. VR-3 - A mixture of commercial fatty acids sold by Union Carbide Chemicals and Plastics Inc. Corporation.

USS-13031 - A highly reactive unsaturated polyester resin believed to be ortho-phthalic anhydride modified containing approximately 40 weight percent of styrene sold by USS Chemicals Polyester Unit. 70 parts per million of parabenzoquinone, based on the polyester are added.

OCF-951 - A fiberglass roving chopped to desired length on the sheet molding compound machine and sold by Owens corning Fiberglass Corp.

Silicon-Oxyalkylene Copolymer Flow Additives:

I:
78%
$(MeSiO_{3/2})_{1.2}[(Me_2SiO)_{6.6}(C_2H_4O)_{19.3}(C_3H_6O)_{14.6}OBu]_3$ and 22%
$(MeSiO_{3/2})_{1.2}[(Me_2SiO)_{6.6}(C_2H_4O)_{33}(C_3H_6O)_{23}OBu]_3$ II:
$MeSiO(Me_2SiO)_{13}(MeSiO)_{5.5}SiMe_3$
$\quad\quad\quad\quad\quad\quad |$
$\quad\quad\quad\quad\quad C_3H_6O(C_2H_4O)_{7.5}H$ III:
50% FLOW ADDITIVE II
50% 50HB55 (polyether sold by Union Carbide Chemicals and Plastics Inc.

IV:
55% 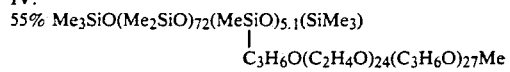

45% Blend 50HB260, 50HB660, 50HB2000 (polyethers sold by Union Carbide Chemicals and Plastics Inc.)

V:
15% 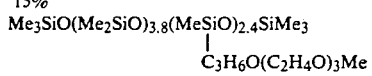

45% LHT-240 (sold by Union Carbide Chemicals and Plastics Inc. Corporation)
40% TERGITOL NP-9 (sold by Union Carbide Chemicals and Plastics Inc.

VI:
Dimethylsiloxane with an ethyleneoxy and propyleneoxy copolymeric tail
X-5889:

$$CH_3(OCH_2CH_2)_xOCH_2CH_2CH_2SI(OR)_3$$

VII:
$Me_3SiO(MeSiO)_{20}(MeSiO)_{3.2}$
$C_3H_6O(C_3H_6O)_{16}-(C_2H_4O)_{25}(C_3H_6O)_{5.8}H$ VIII:
50%
$Me_3SiO(Me_2SiO)_{43.2}$
$C_3H_6-O(C_2H_4O)_{25}(C_3H_6O)_{5.8}OH$ 50% Tergitol NP-9 from Union Carbide Chemicals and Plastics Inc.

IX:
A long chain dimethyl siloxane with an ethylene oxide/propylene oxide copolymer attached to the siloxane from Union Carbide Chemicals and Plastics Inc., referred to as Y-10,006.

X:
77%
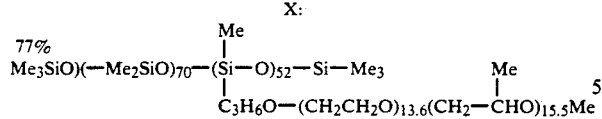

and

23%
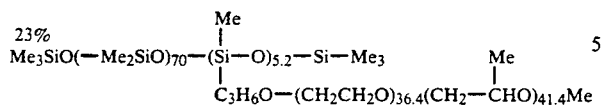

GENERAL PROCEDURE FOR PREPARATION OF BULK MOLDING COMPOUND (BMC) FORMULATIONS

All the liquid components were weighed individually into a Hobart mixing pan placed on a Toledo balance. The pan was attached to a Model C-100 Hobart mixer (in a hood). The agitator was started at slow speed, then increased to medium speed to completely mix the liquids over a period of 3-5 minutes. The agitator was then stopped and the internal mold release agent and/or fatty acid was next added to the liquid from an ice cream carton. The Hobart mixer was restarted and the mold release agent mixed with the liquid until it was completely wet out. The filler was next added to the pan contents (agitator off) then mixed, using medium to high speed, until a consistent paste was obtained. The mixer was again stopped and the weighed amount of thickening agent was mixed into the paste over a period of 2-3 minutes, the mixer was again stopped and 175 grams of the paste were removed from the pan (using a large spatula) and transferred to a wide-mouthed 4 oz. bottle. This paste sample was stored in the capped bottle at room temperature and the viscosity was measured periodically using a Model HBT 5X Brookfield Synchro-Lectric Viscometer on a Helipath Stand.

After removal of the paste sample, the contents were reweighed and styrene loss made up, the chopped glass fibers were added slowly (from an ice cream carton) to the pan with the mixer running on slow speed. The mixer was run for 30 seconds after the glass was in the paste. This short time gave glass wet out without glass degradation. The pan was then removed from the mixer and separate portions of the BMC mix of 450 grams each were removed using spatulas and transferred to aluminum foil lying on a balance pan (balance in the hood). The mix was tightly wrapped in the aluminum foil (to prevent loss of styrene via evaporation) and stored at room temperature until the viscosity of the retained paste sample reached molding viscosity. The weight of the BMC added to the foil varies with the molding application.

GENERAL PROCEDURES FOR PREPARATION OF SHEET MOLDING COMPOUND (SMC) FORMULATIONS

All the liquid components were weighed individually into a 5 gallon open top container placed on a Toledo balance. The contents of the container were the mixed (in a hood) with a high speed Cowles-type dissolver. The agitator was started at a slow speed, then increased to a medium speed to completely mix the liquids over a period of 2-3 minutes the mold release agent and/or fatty acid was next added to the liquids from an ice cream carton and mixed until completely dispersed. The filler was next added gradually from a tared container until a consistent paste was obtained and the contents were then further mixed to a minimum temperature of 90° F. The thickener was next mixed into the paste over a period of 2-3 minutes, the mixer was stopped and 175 grams of the paste was removed from the container and transferred to a wide-mouthed 4 oz. bottle. The paste sample was stored in the capped bottle at room temperature and the viscosity measured periodically using a Model HBT 5X Brookfield Synchro-Lectric Viscometer on a Helipath Stand.

The balance of the paste is next added to the doctor boxes on the SMC machine were it is further combined with fiber glass (fibers). The sheet molding compound,. (SMC) is then allowed to mature to molding viscosity and then molded into the desired article.

MOLDING FACILITIES 12"×12"×⅛" TEST PANELS

Flat panels for evaluation are molded on a 75 ton Queens Hydraulic press. The press contains a matched dye set of 12"×12" chrome plated molds. The female cavity is installed in the bottom and the male portion is at the top. Both molds are electrically heated and are controlled on separate circuits so that the molds can be operated at different temperatures. The top and bottom temperature was 300° F. The molding pressure which can be varied from 0-75 Ton was run at maximum pressure. The molds do not contain ejector pins: therefore, the molded panel is removed with a rubber suction cup and the use of a stream of air. The panels are laid on a flat surface, weighted to keep them flat and allowed to cool overnight. The molded panel is measured with a micro caliper from corner to corner in all four directions to determine shrinkage which is an average of the four readings.

Description of Transfer Molding Procedure

A 100 ton hydraulic transfer press was utilized. The mold was an ASTM tree mold. The temperature used was approximately 300° F. To determine flow properties a 160 g. charge of bulk molding compound was charged to the ram cylinder and injected into the closed mold at various pressures, typically 1000 psi. The flow of the compound was judged by the time taken to empty the cylinder and fill the mold. The shorter the time, the better the flow of the compound.

PHYSICAL PROPERTIES

Physical properties such as tensil strength, flexural strength and Izod Impact (notched) were all determined by standard ASTM tests for glass reinforced thermosetting polyester resin composites.

MCR DETERMINATIONS

MCR values are obtained by the use of a Bendix Profilometer which runs a stylus over the surface of a panel measuring the deviation above or below a normal, therefore, recording the peaks and valleys of the surface. The lower the MCR number, the better the surface.

FLOW ADDITIVE SCREEN TEST

This is conducted in a 12" by 12" matched metal die mold in a 75 ton molding press at temperatures of approximately 300° F. at cure times of 90-120 seconds:

(a) 75 g charge placed in lower, left corner of the mold. The panels were molded at 35 ton and 75 ton molding pressure and compared.

(b) 75 g charge placed in the middle of 12"×12" mold. The panels are molded at 75 ton.

(c) 100 g. charge placed in lower left corner of 12"×12" mold. Panels are molded at 75 ton.

The cured panels obtained were compared to a prepared grid representing the full 12"×12" area and the numbers of squares not filled recorded as the flow rating. Therefore, the lower the number the better the flow.

Four hundred fifty gram 12"×12" flat panels are also molded from each of the formulations containing flow additives and the following properties measured on the panels. These panels were approximately 0.110 inches in thickness.

1. Shrinkage
2. Tensile Strength
3. Elongation
4 Flexural Strength

The results of the flow and physical measures are tabulated below. Three of the formulations listed are considered controls or standards which are used to rate the potential flow additives.

1. Base BMC formulation listed below with no flow additive. This formulation established the base line. The flow rating for this formula is 82. The lower the molding pressure at a fixed charge weight, the better the flow.

2 Microthene ™, a finely divided polyethylene power, is often added to injection molding formulations by molders to improve flow. This material is considered a "state of the art" flow additive. The flow rating for this material is 48.

3. Y-5889, a silylated CARBOWAX has been used commercially to treat alumina trihydrate to reduce the initial paste viscosities of bulk molding compound (BMC) and sheet molding compound (SMC) containing the treated alumina. Data generated indicates this material also improves the flow of the molding compound. The flow rating for this additive is 42.

Using the above three formulations as standards, a series of additives are evaluated as flow additives. Results of the screening evaluation are tabulated in Tables I, II and III.

Tables IV, V, and VI set forth transfer molding experiments. In Table IV, formulations of experiments 7 and 8 are aided by presence of a polyol. In Table VI, the formulation of experiment 2 exhibits an impact ratio higher than the control; the formulation experiment 3 has a neutral impact ratio relative to the control the formulations of experiments 4 and 5 show lower average Izod impact strength relative to the control.

TABLE I

| FLOW STUDY FORMULATION | |
|---|---|
| Formulation | Parts by Wt./100 |
| Freeman 3906 (Unsaturated Polyester) | 65 |
| Union Carbide Chemicals and Plastics Inc. LP-40A (Low Profile Additive) | 35 |
| Cal White II (Calcium Carbonate Filler) | 180 |
| Zinc Stearate (Mold Release) | 2 |
| Union Carbide Chemicals and Plastics Inc. VR-3 (Viscosity Reducer) | 2 |
| TBPB (Tertiary Butyl Perbenzoate Peroxide) | 1.5 |
| Modifier M (Thickener) | 2.8 |
| Flow Additive | 2 |
| Fiberglass | 25-26 Wt. % |
| MOLDING PARAMETERS | |
| BMC Molding Viscosity | approx. 30 MM Centipoises |
| Charge Placement | Center of Mold |
| Temperature | 300° F. |
| Pressure | 75 Tons |
| Cure Time | 450 panel - 3 minutes |
| | 75 panel - 2 minutes |

TABLE II

BMC - FLOW ADDITIVE SCREEN TEST

| Flow Additive | Flow Rating | Molding Viscosity cps | Shrinkage mils/inch | Tensile, psi | Elong. | Flex. | Water Absorb. Wt. % |
|---|---|---|---|---|---|---|---|
| X | 4 | 28 MM | 0.0 | 6170 | .34 | 20,169 | 0.39 |
| I | 4 | 30 MM | 0.19 | 5578 | .15 | 13,553 | 0.42 |
| II | 26 | 42 MM | 0.48 | 6658 | .36 | — | .475 |
| III | 25 | 44.8 MM | 0.29 | 5120 | .25 | 14,952 | — |
| V | 25 | 30.4 MM | 0.10 | 7975 | .65 | — | .40 |
| VI | 32 | 28 MM | +0.15 | 6155 | .34 | — | .34 |
| Y-5889 | 42 | 27 MM | +.037 | 5821 | .42 | 12,932 | 0.37 |
| Microthene | 48 | 19.2 MM | 0.06 | — | .66 | 15,602 | 0.28 |
| CONTROL | 71 | 23.2 MM | — | — | — | — | — |
| CONTROL | 82 | 38 MM | 0.46 | 5995 | .29 | 17,990 | — |
| Union Carbide Chemicals and Plastics Inc. 50HB55 | 79 | 27 MM | — | — | — | — | — |
| Union Carbide Chemicals and Plastics Inc. Tergitol NP-14 | 57 | 35 MM | — | — | — | — | — |
| Union Carbide Chemicals and Plastics Inc. 50HB5100 | 79 | 27 MM | — | — | — | — | — |

TABLE III

BMC SCREENING

| FLOW RATINGS | FLOW ADDITIVES |
|---|---|
| 4-10 | X, I |
| 18-29 | II, III, V |
| 30-50 | VI, Y-5889 |
| CONTROL | 38 MM - 82 |
| | 23 MM - 71 |
| 82 | approx. 85% MOLD FILL OUT |
| 4 | >99% MOLD FILL OUT |

TABLE IV

TRANSFER MOLDING BMC EXPERIMENTS
Parts by Weight

| | Experiment No. | | | | | | | |
|---|---|---|---|---|---|---|---|---|
| | 1 | 2 | 3 | 4 | 5 | 6 | 7 | 8 |
| U.S. Steel MR-13031 | 60 | 60 | 60 | 60 | 60 | 60 | 60 | 60 |
| Union Carbide Chemicals and Plastics Inc. LP-40A | 40 | 40 | 40 | 40 | — | 40 | 40 | 40 |
| Union Carbide Chemicals and Plastics Inc. XLP-4514 | — | — | — | — | 44.5 | — | — | — |
| V Flow Additive | — | 3 | — | — | — | — | — | — |
| IX Flow Additive | — | — | 2 | — | — | — | — | — |
| VII Flow Additive | — | — | — | 2 | — | — | — | — |
| I Flow Additive | — | — | — | — | 2 | — | — | 0.8 |
| VIII Flow Additive | — | — | — | — | — | 2 | — | — |
| II Flow Additive | — | — | — | — | — | — | 0.8 | — |
| Union Carbide Chemicals and Plastics Inc. LHT-240 | — | — | — | — | — | — | 1.2 | 1.2 |
| Carmel Wite | 140 | 140 | 140 | 140 | 140 | 140 | 140 | 140 |
| ASP-400 | 21 | 21 | 21 | 21 | 21 | 21 | 21 | 21 |
| PD11803 | 0.3 | 0.3 | 0.3 | 0.3 | 0.3 | 0.3 | 0.3 | 0.3 |
| p-benzoquinnone | 0.02 | 0.02 | 0.02 | 0.02 | 0.02 | 0.02 | 0.02 | 0.02 |
| PG-9089 | 9.85 | 9.98 | 10.7 | 11.5 | 10.9 | 10.7 | 10.7 | 10.7 |
| PPG3029 | 20 | 20 | 20 | 20 | 20 | 20 | 20 | 20 |
| ¼ (Wt. %) Inch glass | | | | | | | | |
| Molding Viscosity cps × $10^6$ | 12 | 10 | 14.1 | 12.8 | 11.6 | 13.2 | 9.6 | 13.2 |

TABLE V

RESULTS OF TRANSFER MOLDING EXPERIMENTS

| | Experiment No. | | | | | | | |
|---|---|---|---|---|---|---|---|---|
| | 1 | 2 | 3 | 4 | 5 | 6 | 7 | 8 |
| Time to Fill Mold, Seconds | | | | | | | | |
| at 1000 psi | 13.0 | 8.0 | 11.0 | 6.5 | 8.0 | 8.5 | 8.5 | 9.5 |
| at 600 psi | 31 | 25 | 25 | 15.0 | 21.5 | 20 | 26 | 24 |
| Bar Length | 4.988 | 4.993 | — | 4.988 | 4.990 | 4.990 | 4.990 | 4.991 |

TABLE VI

OTHER TRANSFER MOLDING EXPERIMENTS
Parts by Weight

| | 1 | 2 | 3 | 4 | 5 |
|---|---|---|---|---|---|
| USS-13031 | 60 | 60 | 60 | 60 | 60 |
| LP-40A | 40 | 40 | 40 | 40 | 40 |
| VII Flow Additive | — | 0.5 | 1.0 | — | — |
| III Flow Additive | — | — | — | 0.75 | — |
| II Flow Additive | — | — | — | — | 0.75 |
| Carmel Wite | 140 | 140 | 140 | 140 | 140 |
| ASP-400 | 21 | 21 | 21 | 21 | 21 |
| Zinc Stearate | 4 | 4 | 4 | 4 | 4 |
| TBPB | 1.5 | 1.5 | 1.5 | 1.5 | 1.5 |
| PBQ | 0.02 | 0.02 | 0.02 | 0.02 | 0.02 |
| PDI-1803 | 0.3 | 0.3 | 0.3 | 0.3 | 0.3 |
| PG-9089 | 10.6 | 10.6 | 13.75 | 10.6 | 10.6 |
| $H_2O$ | 0.05 | 0.05 | 0.05 | 0.05 | 0.05 |
| PPG-3209 (Wt. %) | 20.0 | 20.0 | 20.0 | 20.0 | 20.0 |
| Physical Properties, Tensile Strength, Mpsi | 4.2 | 4.9 | 4.7 | 6.8 | 5.1 |
| % Increase | — | 16.7 | 11.0 | 6.8 | 5.1 |
| Izod Impact (ft-lbs/inch) | 1.1 | 1.2 | 1.2 | 1.6 | 1.8 |
| (against flow) | 4.5 | 5.7 | 4.5 | 3.1 | 2.8 |
| avg. Izod Impact (ft-lbs/inch) | 2.80 | 3.45 | 2.85 | 2.35 | 2.30 |
| MCR | 49.6 | 45.9 | 42.0 | 37.0 | 29.7 |
| Impact Ratio | 3.8 | 4.75 | 3.75 | 1.94 | 1.56 |

APPLICATION TO SHEET MOLDING COMPOUND (SMC)

Examples showing the applicability of this invention to SMC are shown in Tables VII and VIII.

TABLE VII

SHEET MOLDING EXPERIMENTS
Sheet Molding Compound (SMC) was prepared using the following formulations:

| | Experiment No. | |
|---|---|---|
| | Parts by Wt. 1 | Parts by Wt. 2 |
| Koppers 3702-5 | 50 | 50 |
| Union Carbide Chemicals and Plastics Inc. LP-40A | 37 | 37 |
| Styrene | 11 | 11 |
| PDI-1805 | 0.5 | 0.5 |
| t-butyl perbenzoate | 1.2 | 1.2 |
| Air Products PEP-308 | 0.6 | 0.6 |
| Zinc stearate | 2.0 | 2.0 |
| Union Carbide Chemicals and Plastics Inc. VR-3 | 2.0 | 2.0 |
| Cal White II | 180 | 180 |
| B Side[1] | 9.8 | 9.8 |
| OCF-980 1" Fiber Wt. % | — | — |
| II Flow Additive | — | 2 |
| LHT-240 | — | 2 |

1. B Side formulation:
Union Carbide Chemicals and Plastics Inc. LP-90 - 30%;
styrene 10.07%;
PG-9033 (MgO) - 200%;
Cal White II - 40%

Surface smoothness of experiment 2 is much better than that of the control experiment 1 as molded at 300° F. and 1000 psi pressure for 2 minutes to form an 18"×0.120" laminate. In a 12"×12" matched metal die mold under similar conditions of temperature, pressure and cure time the material of experiment 1 required 200 grams of SMC to fill out the mold, while experiments 2 required only 150 grams to fill out the mold indicating better flow properties.

TABLE VIII

FURTHER SMC EXPERIMENTS

| | Experiment No. | | |
|---|---|---|---|
| | Parts by Wt. 1 | Parts by Wt. 2 | Parts by Wt. 3 |
| Freeman 3906 | 65 | 65 | 65 |
| Union Carbide Chemicals and Plastics Inc. LP-40A | 35 | 35 | 35 |
| Cal White II | 180 | 180 | 180 |
| Zinc Stearate | 2 | 2 | 2 |
| Union Carbide Chemicals and Plastics Inc. VR-3 | 2 | 2 | 2 |
| PDI-1803 | 0.3 | 0.3 | 0.3 |
| Modifier M | 2.6 | 2.6 | 2.6 |
| I Flow Additive | — | 2.0 | — |
| V Flow Additive | — | — | 2.0 |
| OCF-951 one (Wt. %) inch fiberglass | 26 | 26 | 27 |
| Molding Viscosity, cps × $10^{-6}$ | 40 | 39 | 33 |
| Flow Rating | 71 | 14 | 31 |
| Shrinkage, mils/inch | 0.17 | +0.25 expansion | +0.08 expansion |

Shrinkage measurement is the comparison of the dimensions of the part at room temperature with the dimensions of the 12"×12" matched metal die mold used to mold t he parts at 300° F. for 2-3 minutes at 75 tons of pressure. The expansion indicates at better reproduction of the mold surface.

What is claimed is:

1. A molding additive composition comprising:
   (a) about 25 to 70 weight percent of a thermosetting unsaturated polyester or a vinyl ester;
   (b) about 5 to about 25 weight percent of a low profile additive;
   (c) about 35 to 70 weight percent of a crosslinking monomer which is olefinically unsaturated and crosslinkable with said thermosetting polyester or said vinyl ester; and
   (d) about 1 to 5 weight percent of a silicon oxyalkylene copolymer flow control agent wherein the silicon oxyalkylene copolymer contains a functional group having olefinic unsaturation and is reactive with the thermosetting polyester or vinyl ester and wherein the silicon oxyalkylene copolymer has a molecular weight less than that of the low profile additive.

2. The molding additive composition of claim 1 wherein said crosslinking monomer is selected from the group consisting of styrene, a styrene derivative, or a mixture thereof.

3. The molding additive composition of claim 1 wherein the crosslinking monomer is an acrylate or methacrylate derivative.

4. The molding additive composition of claim 1 wherein said silicon-oxyalkylene copolymer flow control agent contains
   (a) at least one silicon per molecule;
   (b) at least 2 alkylene oxide moieties in a sequence per molecule;
   (c) the alkylene oxide are bonded to silicon in the molecule through a carbon to silicon bond.

5. A fiber reinforced molding composition comprising
   (a) about 25 to 70 weight percent of a thermosetting unsaturated polyester or a vinyl ester;
   (b) about 5 to 25 weight percent of a low profile additive;
   (c) about 35 to 70 weight percent of a crosslinking monomer which is olefinically unsaturated and crosslinkable with said thermosetting polyester or said vinyl ester;
   (d) about 1 to 5 weight percent of a silicon oxyalkylene copolymer flow control agent wherein the silicon oxyalkylene copolymer contains a functional group having olefinic unsaturation and is reactive with the thermosetting polyester or vinyl ester and wherein the silicon oxyalkylene copolymer has a molecular weight less than that of the low profile additive; and
   (e) a reinforcing fiber.

6. The fiber reinforced molding composition of claim 5 wherein the reinforcing fiber in glass fiber.

7. The fiber reinforced molding composition of claim 5 wherein the reinforcing fiber is carbon fiber.

8. The fiber reinforced molding composition of claim 7 wherein the carbon fiber is in the form of graphite.

9. The fiber reinforced molding composition of claim 6 wherein the glass fiber is staple fiber.

10. The fiber reinforced molding composition of claim 5 wherein the carbon fiber is staple fiber.

11. An improved low profile additive molding composition comprising
    (a) a thermosetting polyester resin,
    (b) from about 25 to 70 weight percent of a crosslinkable olefinically unsaturated monomer that is crosslinkable with the polyester resin,
    (c) from about 1 to 25 weight percent of a thermoplastic low profile additive for shrinkage control, and
    (d) from about 1 to 5 weight percent of a silicon-oxyalkylene copolymer flow control agent wherein the silicon oxyalkylene copolymer contains a functional group having olefinic unsaturation and is reactive with the thermosetting polyester resin and wherein the silicon oxyalkylene copolymer has a molecular weight less than that of the low profile additive.

12. The improved low profile additive molding composition of claim 11 wherein the thermosetting polyester resin comprises a vinyl ester resin.

13. The molding additive composition of claim 1 containing a non-silicon containing polyoxyalkylene material.

14. An improved low profile additive molding composition according to claim 11 comprising:
    (a) from about 30 to 55 weight percent of the thermosetting unsaturated polyester or vinyl ester resin,
    (b) from 35 to 60 weight percent of the crosslinkable olefinically unsaturated monomer that is crosslinkable with the polyester resin,
    (c) from about 5 to 20 weight percent of the thermoplastic low profile additive for shrinkage control, and
    (d) from about 1 to 5 weight percent of the silicon-oxyalkylene copolymer flow control agent.

15. The molding composition of claim 14 wherein the silicon-oxyalkylene copolymer is present in an amount ranging from about 2 to 3 percent.

16. The molding composition of claim 14 wherein the low profile additive is poly(vinylacetate).

17. The molding composition of claim 14 wherein the olefinically unsaturated monomer is styrene or a styrene derivative.

* * * * *